(12) United States Patent
Mahoney

(10) Patent No.: US 6,880,290 B2
(45) Date of Patent: Apr. 19, 2005

(54) FISHING GEAR RECOVERY DEVICE

(76) Inventor: Patrick Mahoney, P.O. Box 361, York Harbor, ME (US) 03911

( * ) Notice: Subject to any disclaimer, the term of this patent is extended or adjusted under 35 U.S.C. 154(b) by 0 days.

(21) Appl. No.: 10/237,591

(22) Filed: Sep. 9, 2002

(65) Prior Publication Data

US 2004/0045213 A1 Mar. 11, 2004

(51) Int. Cl.$^7$ .............................................. A01K 69/08
(52) U.S. Cl. ............................. 43/100; 43/17.2; 43/4.5
(58) Field of Search ....................... 43/1, 4, 5, 7, 17.2, 43/100, 101, 102, 103, 104, 105; 294/66.1; 441/2, 7, 8, 9, 10

(56) References Cited

U.S. PATENT DOCUMENTS

| | | | | |
|---|---|---|---|---|
| 844,945 A | * | 2/1907 | Le Beau | 43/100 |
| 2,190,531 A | * | 2/1940 | Koboskey et al. | 441/8 |
| 2,479,021 A | * | 8/1949 | Perkins | 441/8 |
| 2,588,637 A | * | 3/1952 | Krantz | 441/8 |
| 2,723,404 A | * | 11/1955 | Krantz | 441/8 |
| 2,806,231 A | * | 9/1957 | Hofmeister | 441/8 |
| 2,903,716 A | * | 9/1959 | Zasada | 441/21 |
| 3,426,472 A | * | 2/1969 | Richard | 43/100 |
| 3,531,887 A | * | 10/1970 | Bortle | 43/17.2 |
| 3,724,120 A | * | 4/1973 | Richard | 43/100 |
| 3,772,639 A | * | 11/1973 | Snyder | 367/4 |
| 3,818,524 A | * | 6/1974 | Starkey | 441/25 |
| 4,034,693 A | * | 7/1977 | Challenger | 114/333 |
| 4,218,843 A | * | 8/1980 | Clarke, Jr. | 43/131 |
| 4,249,277 A | * | 2/1981 | Plante | 441/23 |
| 4,262,379 A | * | 4/1981 | Jankiewicz | 441/2 |
| 4,290,159 A | * | 9/1981 | McLennan et al. | 441/8 |
| 4,445,295 A | * | 5/1984 | Litrico | 43/102 |
| 4,507,093 A | * | 3/1985 | Norvell | 441/2 |
| 4,778,422 A | * | 10/1988 | Saulnier et al. | 441/26 |
| 5,156,562 A | * | 10/1992 | Pearson et al. | 441/8 |
| 5,219,245 A | * | 6/1993 | Chin-Yee | 405/191 |
| 5,615,511 A | * | 4/1997 | Crane et al. | 43/17.2 |
| 5,926,998 A | * | 7/1999 | Nelson | 43/102 |
| 6,000,168 A | * | 12/1999 | Demusz et al. | 43/65 |
| 6,261,142 B1 | * | 7/2001 | Fiotakis | 441/11 |
| 6,403,889 B1 | * | 6/2002 | Mehan et al. | 174/120 R |
| 6,463,692 B1 | * | 10/2002 | Johnsen | 43/17.2 |

FOREIGN PATENT DOCUMENTS

GB 2150801 * 7/1985

* cited by examiner

Primary Examiner—Kurt Rowan
Assistant Examiner—David J Parsley
(74) Attorney, Agent, or Firm—Pierce Atwood; Kevin M. Farrell

(57) ABSTRACT

Disclosed is a fishing gear recovery device and methods of use. The fishing gear recovery device of the present invention includes a recovery line housing, which is preferably produced from flexible tubular plastic stock. Attachments points are provided in the recovery line housing for the attachment of a recovery line, and biodegradable connectors. Additionally, the recovery device includes a buoyancy providing element.

16 Claims, 1 Drawing Sheet

FISHING GEAR RECOVERY DEVICE

BACKGROUND OF THE INVENTION

Lost fishing gear is a problem with great financial and environment consequences. Lobster and crab traps, for example, are frequently lost due to separation of the trap line from the associated surface buoy. This problem is largely a financial problem, and the damages are easily calculated.

With respect to other types of fishing gear, such as gillnets, there is a significant environmental consequence in addition to the financial losses associated with lost gear. Gillnets can be lost, for example, due to storms, boat strikes or parted buoy lines. Gillnets lost in this manner "continue to fish" once lost. That is, fish trapped within the net die within the net. These dead and decaying fish serve to attract more fish to the site to face the same consequences. This phenomenon has been referred to as "ghost fishing."

It has been observed that the quantity of gear lost at sea world-wide, and continuing to fish, exceeds the gear currently in use by many-fold. A device that would assist in the recovery of such lost gear would be a great benefit to the industry, as well as to the populations of the sea.

SUMMARY OF THE INVENTION

The present invention relates to a fishing gear recovery device and methods of use. The fishing gear recovery device of the present invention includes a recovery line housing, which is preferably produced from flexible tubular plastic stock. Attachments points are provided in the recovery line housing for the attachment of a recovery line, and biodegradable connectors. Additionally, the recovery device includes a buoyancy providing element.

DETAILED DESCRIPTION OF THE INVENTION

Figure 1:
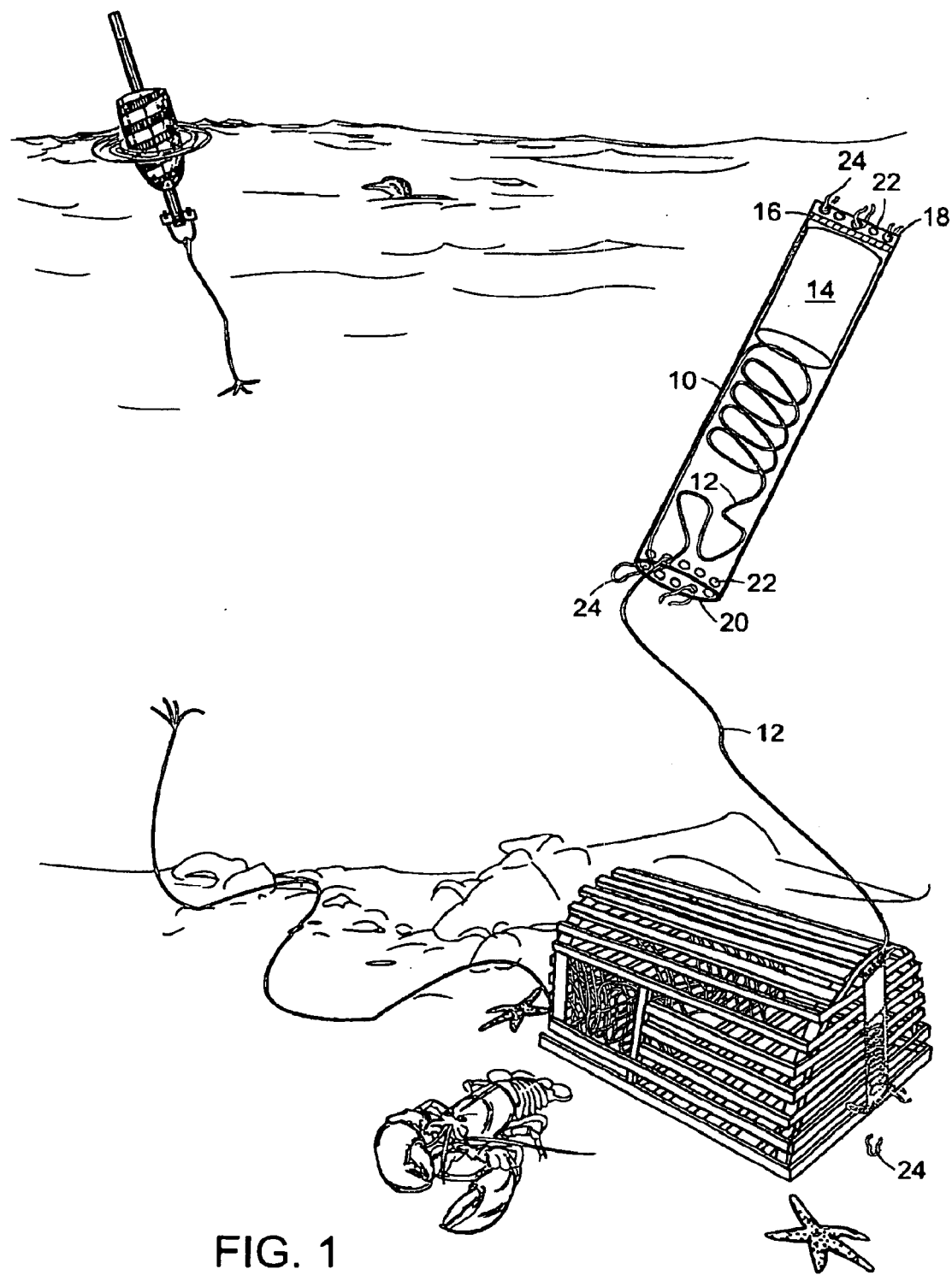
FIG. 1 is a perspective view of the fishing gear recovery device of the present invention.

The present invention relates to a fishing gear recovery device. In preferred embodiments, the fishing gear recovery device of the present invention includes: a) a recovery line housing; b) attachment points in the recovery line housing for a recovery line and biodegradable connectors; and c) a buoyancy providing element.

Referring to FIG. 1, preferred embodiments of the present invention include a recovery line housing (10) which is produced from tubular stock of UV-resistant plastic. It will be recognized that the tubular shape is non-critical, but practical and convenient. Consider, for example, a gear recovery device sized for recovery of a lobster trap weighing approximately 75–150 pounds, from a depth of 100 feet or less.

For such an application, a recovery line (12), having a breaking strength of at least about 600 pounds, is appropriate. While such a recovery line may be supplied with the recovery device, many fisherman have individual preferences with respect to rope type or length. Therefore, the recovery device may be offered in an unloaded form (i.e., containing no recovery line) and an end user may load the recovery device with a recovery line of choice.

Plastic tubing having a diameter of about 2–4 inches and a length of about 12–15 inches provides an interior volume sufficient to house such a recovery line, with sufficient additional volume available for purposes of providing buoyancy. Flexible, heat-sealable plastics are best suited for this application. PVC, HDPE, CVPVC, polystyrene, and plastics having similar properties are examples of plastic material particularly well suited for use in production of the housing.

Referring again to FIG. 1, preferred embodiments of the gear recovery device include a heat crimp seal (16) at a first end (18) of the housing (10) to ensure recovery line deployment takes place from the opposite end (20) of the housing (10). The housing is also provided with one or more mounting holes (22) for the purpose of attaching the housing to the trap or gear to be recovered, if lost. Preferably, a plurality of mounting holes (22) are provided. FIG. 1 shows 5 mounting holes (22) on each end (18 and 20) of the recovery device housing (10). When a plurality of holes are provided at opposite ends of the device, as shown in FIG. 1, the gear recovery device can be securely attached and will not flop about during handling, which could result in accidental removal or damage to the device.

The mounting holes are fitted with biodegradable fasteners. Such biodegradable fasteners include a ring-type, known in the industry as "hog rings." The biodegradable fasteners (24) are attached to a secure portion of the fishing gear, such as the cage portion of a lobster trap, or a cable or filament portion of a gillnet. The biodegradable fasteners (24) are replaced on a rotating basis. The replacement of these fasteners on a rotating basis ensures that the recovery device is securely attached to a trap unless it is left under corrosive conditions (i.e., under sea water) for an extended period of time without replacement of degraded hog rings (e.g., if the trap is lost at sea).

A buoyancy-providing element (14) is an essential element of the gear recovery device. For relatively shallow water application (e.g., about 180 feet or less), a high density foam material will provide sufficient buoyancy. Examples of suitable high-density foams include, for example, PVC foam, styrene foam and urethane foam. Such foams may be friction fit within the housing to ensure that they are secure. Alternatively, it may be desirable to employ and adhesive to secure the buoyancy-providing element in place. It may also be possible to employ a heat-shrinkable plastic material in the construction of the housing. In this case, the buoyancy-providing element would be inserted within the tubing, and the tubing would be heated to shrink the plastic around the buoyancy-providing element.

For deeper water versions (e.g., greater than 180'), a buoyancy-providing device known in the art as a "sealed plastic toggle" can be employed. A sealed plastic toggle is essentially a sealed high-impact plastic housing containing a trapped air volume. Such a toggle is securely inserted into the housing in a manner similar to that described for the high density foam for shallower water applications.

In use, recovery line (12) is loaded into the recovery device housing (10) through the non-heat-crimped end (20). One end of the recovery line (12) is secured to the device housing. This can be accomplished by simply tying off one end of the recovery line to one of the mounting holes (22) provided in the housing (10). Preferably, the end of the recovery line which is attached to the recovery device is attached at a mounting hole at end 20 (the non-heat-crimped end) of the device. The other end of the recovery line extends out through end 20 (the loading end) of the device and is subsequently secured to a trap when the device is attached to a trap.

Biodegradable fasteners (24) attach the gear recovery device to fishing gear. Preferably, the recovery device is attached to the trap such that the housing (10) is vertically oriented when the trap is positioned as it is intended to be positioned on the sea floor. End 20 is preferably positioned at the bottom in this vertical orientation with end 18 being positioned at the top. The mounting of the recovery device to the trap in this orientation reduces the likelihood of line fouling which would prevent the recovery device from reaching the surface following degradation of the biodegradable fasteners (24).

The rate of degradation of such biodegradable fasteners (24) is dependent upon a variety of factors including, for example, temperature and salinity. Typically, such fasteners maintain their integrity for a period of months. It may be possible, however, to produce such fasteners from a gauge of material which will result in degradation under conditions of use within a period of weeks, or even days. The use of a larger number of rings (e.g., 4 to 8) allows a fisherman to replace one or two rings on a rotating basis, thereby minimizing the risk of unwanted deployment (i.e., deployment from gear which has not been lost).

If a trap is lost, the recovery device will remain attached to the trap until the last biodegradable fastener fails. At that time, the unsealed end (20) of the housing (10) will open and the recovery line (12) will spool out as the housing returns to the surface.

The recovery line is attached at one end to the recovery line housing, and at the other end, to the gear. In preferred embodiments, the color of the housing is highly visible. When gear is lost, a fisherman scans the surface in the area of the lost gear to find the deployed fishing gear recovery device. End 18 will protrude from the surface of the water due to the positioning of the buoyancy-providing element (14).

In other embodiments, the present invention relates to methods for recovering lost fishing gear. The methods require the attachment of a fishing gear recovery device, of the type described above, to the gear prior to loss. Following loss, the fisherman searches the surface at the area of loss for a deployed recovery device. Upon location of the deployed device, the recovery line which tethers the recovery device to the gear is used to retrieve the lost gear.

What is claimed is:

1. A fishing gear recovery device for recovery of fishing gear lost due to separation from an associated surface buoy, comprising:
   a) a free-loading recovery line housing produced from tubing stock for containing recovery line when the fishing gear recovery device is not deployed, the recovery line housing having a first unsealed end for loading and deploying the recovery line;
   b) attachment points in the recovery line housing for:
      i) a recovery line; and
      ii) a plurality of biodegradable connectors which, are replaceable on a rotating basis, one or more of the connectors being positioned to crimp the first unsealed end of the recovery line housing to prevent recovery line release when the recovery device is in a non-deployed state; and
   c) a buoyancy providing element positioned within the recovery line housing;
wherein said biodegradable connectors do not degrade rapidly under conditions of use, but degrade over a period of at least days.

2. The fishing gear recovery device of claim 1 wherein the recovery line housing is produced from a UV-resistant plastic.

3. The fishing gear recovery device of claim 2 wherein the recovery line housing further comprises a first sealed end containing a heat crimp seal.

4. The fishing gear recovery device of claim 1 further comprising a buoyancy providing element providing sufficient buoyancy to carry the fishing gear recovery device to the surface when released from a depth of about 180 feet or less.

5. The fishing gear recovery device of claim 4 wherein the buoyancy providing element is produced from a high density foam.

6. The fishing gear recovery device of claim 5 wherein the high density foam is selected from the group consisting of PVC foam, styrene foam and urethane foam.

7. The fishing gear recovery device of claim 1 further comprising a buoyancy providing element providing sufficient buoyancy to carry the fishing gear recovery device to the surface when released from a depth of about 180 up to about 600 feet.

8. The fishing gear recovery device of claim 7 wherein the buoyancy-providing element comprises a sealed, high-impact plastic housing containing a trapped gas volume.

9. A method for recovering fishing gear lost due to separation from an associated surface buoy, the method comprising:
   a) providing a fishing gear recovery device, comprising;
      i) a free-loading recovery line housing produced from tubing stock for containing recovery line when the fishing gear recovery device is not deployed, the recovery line housing having one unsealed end for loading and deploying the recovery line;
      ii) attachments points in the recovery line housing for:
         1) a recovery line; and
         2) a plurality of biodegradable connectors which are replaceable on a rotating basis, one or more of the connectors being positioned to crimp the unsealed end of the recovery line housing to prevent recovery line release when the recovery device is in a non-deployed state; and
      iii) a buoyancy providing element positioned within the recovery line housing;
   b) attaching the device to fishing gear, prior to loss, using biodegradable connectors;
   c) replacing the biodegradable connectors on a rotating basis throughout the fishing season; and
   d) following loss of the gear, locating the deployed fishing gear recovery device and recovering the gear using the recovery line which tethers the fishing gear recovery device to the gear;
wherein said biodegradable connectors do not degrade rapidly under conditions of use, but degrade over a period of at least a week.

10. The method of claim 9 wherein the recovery line housing is produced from a UV-resistant plastic.

11. The method of claim 9 wherein the recovery line housing has a first end and a second end, the first end containing a heat crimp seal.

12. The method of claim 9 wherein the buoyancy providing element provides sufficient buoyancy to carry the fishing gear recovery device to the surface when released from a depth of about 180 feet or less.

13. The method of claim 12 wherein the buoyancy providing element is produced from a high density foam.

14. The method of claim 13 wherein the high density foam is selected from the group consisting of PVC foam, styrene foam and urethane foam.

15. The method of claim 9 wherein the buoyancy providing element provides sufficient buoyancy to carry the fishing gear recovery device to the surface when released from a depth of about 180 up to about 800 feet.

16. The method of claim 15 wherein the buoyancy-providing element comprises a sealed, high-impact plastic housing containing a trapped gas volume.

* * * * *

UNITED STATES PATENT AND TRADEMARK OFFICE
CERTIFICATE OF CORRECTION

PATENT NO. : 6,880,290 B2
DATED : April 19, 2005
INVENTOR(S) : Patrick Mahoney

It is certified that error appears in the above-identified patent and that said Letters Patent is hereby corrected as shown below:

<u>Column 4,</u>
Line 62, delete "800" and substitute therefor -- 600 --.

Signed and Sealed this

Twenty-eighth Day of June, 2005

JON W. DUDAS
*Director of the United States Patent and Trademark Office*